Oct. 8, 1929. M. C. ROMER 1,731,111
JOINT FOR CORRUGATED BOXES
Filed Jan. 7, 1927
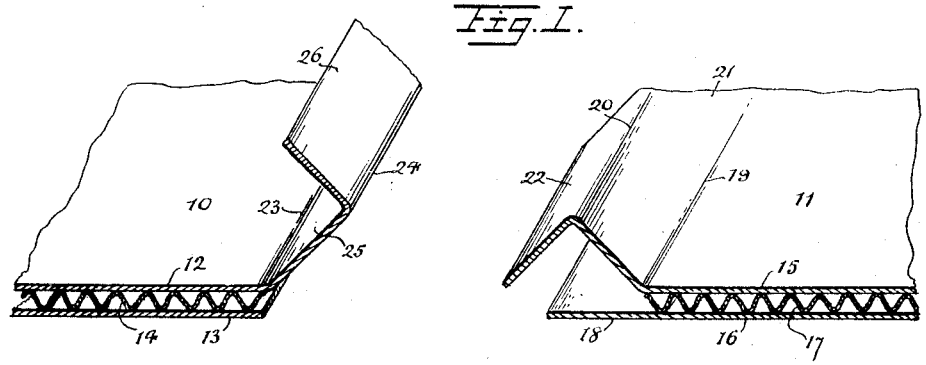
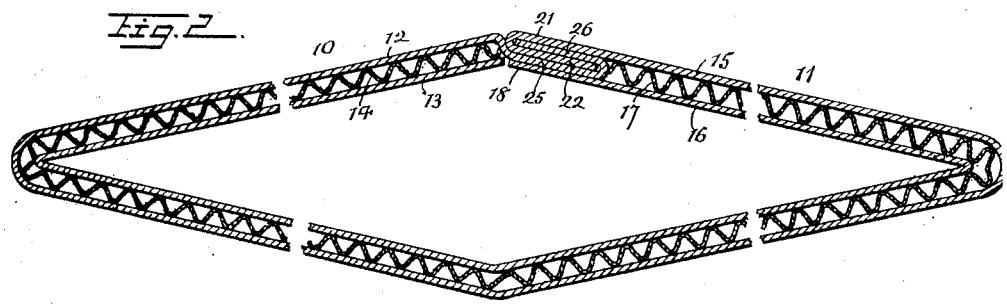
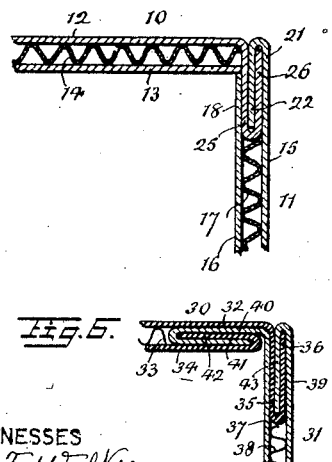
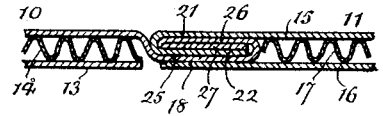
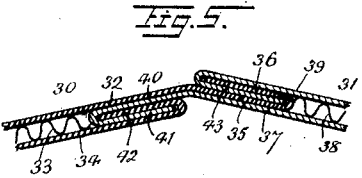
WITNESSES
INVENTOR
Morris C. Romer
BY
ATTORNEY Patented Oct. 8, 1929

1,731,111

UNITED STATES PATENT OFFICE

MORRIS C. ROMER, OF BROOKLYN, NEW YORK

JOINT FOR CORRUGATED BOXES

Application filed January 7, 1927. Serial No. 169,662.

This invention relates to a joint for multiple-ply materials and has particular reference to a joint for corrugated boxes, the same being in the nature of an improvement upon my prior United States Letters Patent No. 1,617,274, granted February 8, 1927.

The present invention comprehends a locking joint for multiple-ply material which joint is especially designed as a corner connection for a box body of the foldable or collapsible type to be employed in lieu of connecting the meeting edges at the corner with a strip of tape as is now the present practice.

The invention furthermore comprehends a lock joint of the character specified which establishes a strong, durable, and flexible connection especially designed for the corner of the box body.

Other objects reside in the simplicity of the construction of the joint, the economy with which the same may be produced, and the general efficiency derived therefrom.

With the above recited and other objects in view, reference is had to the following specification and accompanying drawings in which there is exhibited certain examples or embodiments of the invention which are in no way intended as limitations upon the scope of the appended claims as it is to be clearly understood that variations and modifications which properly fall within the scope of said claims may be resorted to when found expedient.

In the drawings—

Figure 1 is a collective sectional perspective view illustrating the sections of the material in separated relation prior to their interengagement;

Fig. 2 is a horizontal sectional view through the box body partially collapsed and illustrating the improved joint provided at one of the corners;

Fig. 3 is a fragmentary similar sectional view illustrating the lock joint of the box body when set up;

Fig. 4 is a fragmentary sectional view of a slightly modified adaptation of the invention;

Fig. 5 is a fragmentary sectional view illustrating a further modified form of the invention when the box is in partially collapsed condition;

Fig. 6 is a similar view thereof when the box is in set-up condition.

Referring to the drawings by characters of reference, 10 and 11 designate, respectively, two sections of material, the meeting edges of which are adapted to be joined by a lock joint made in accordance with the invention. The material must of necessity be of multiple-ply and is particularly designed for at least three plies of material, including outer, inner and intermediate plies, 12, 13 and 14 of the section 10, and outer, inner and intermediate plies 15, 16 and 17 of the section 11, the intermediate plies 14 and 17 being the usual corrugated filler. In utilizing material of this nature as manufactured, the filler or intermediate ply 14 of the section 10 and the inner ply 13 thereof, are routed away or terminated an appropriate distance from the end of the outer ply 12, while the intermediate ply 17 of the section 11 is routed away or terminated short of the ends of the outer and inner plies 15 and 16. Also in the section 11, the inner ply is cut off or terminated short of the outer ply 15 to provide a projecting portion 18. The outer ply 15 of the section 11 is provided with parallel scores 19 and 20, the former being in substantial alinement with the terminal or extremity of the intermediate ply or filler 17 and the latter in substantial alinement with the terminal or free edge of the portion 18. Between the score lines 19 and 20, an outwardly bendable section 21 is defined and between the score lines 20 and the free edge of the outer ply 15, an inwardly bendable terminal 22 is provided. The projecting portion of the outer ply 12 of the section 10, which extends beyond the remaining plies, is provided with parallel score lines 23 and 24 defining an outwardly bendable portion 25 therebetween and an outwardly bendable portion 26 between the score lines and the free outer edge of said ply.

In practice, the terminal 22 of the section 11 is engaged between the portion 25 and the terminal 26 of the section 10, while the terminal 26 of the section 10 is embraced or interlocked between the portion 21 and the terminal 22 of the outer ply 15 of the section 11. It will further be observed in Figs. 2 and 3, that the portion 25 is also covered on the inner side face by the projecting portion 18 of the inner ply 16 of the section 11. It thus follows that in addition to establishing a strong, durable connection between the sections providing a substantially flush joint, only one ply of material serves as a connecting web between the sections, which admirably adapts the joint for a flexible corner connection employed in a collapsible box body. It is, however, to be understood that while the joint is primarily adapted as a corner joint, this is in no way intended as a limitation upon the use to which it may be put. It should be further noted that either an adhesive, stitching, or any other suitable means may be employed for retaining the interlocked portions in their proper relation. When a box body equipped with a corner joint of this description is set up or opened so that the sections 10 and 11 forming the side walls are disposed at a right angle, the joint assumes the position illustrated in Fig. 3, with the free edge of the extending portion 10 abutting against the inner side faces of the inner ply 13 adjacent its free edge.

In the modified adaptation of the invention illustrated in Fig. 4, the joint is substantially identical with that heretofore described with the exception that the terminal 26 of the outer ply 12 of the section 10 is provided with an extremity 27, the edge of which extremity is alined with the free edge of the terminal 22 of the outer ply 15 of the section 11 in establishing the joint, after which the terminals and portions are rolled over to the position illustrated in Fig. 4, in which position the extremity 27 is disposed between the terminal 26 and the terminal 22.

In the modified form of the invention illustrated in Figs. 5 and 6, the sections 30 and 31 are identically formed or arranged in reversed relation, the section 30 having an outer ply 32 extending considerably beyond the intermediate ply 33 and a distance beyond the inner ply 34, the extending portion of the outer ply 32 having a terminal 35 and a reversely bent extremity 36. The section 31 is provided with an inner ply 37 extending considerably beyond the intermediate ply 38 and a distance beyond the outer ply 39. The extending portion of the inner ply 37 of the section 31 is provided with a bendable extremity 40 and a reversely bent terminal 41. The inner ply 34 of the section 30 is formed with a reversely bent terminal 42 which is interengageable with the terminal 41 on the inner ply 37 of the section 31. The outer ply 39 of the section 31 is provided with a reversely bent terminal 43 which is interengageable with the terminal 36 of the outer ply 32 of the section 30.

In addition to affording an effective lock especially designed for the corner of a box body, it will be noted that the joint thus formed is of two-ply thickness which equals practically the tensile strength of the material from which the box is constructed.

What is claimed is:

1. A lock joint for connecting the meeting edges of sections of multiple ply material, comprising a portion of the outer ply of each section extending beyond the inner ply, said portions being scored, bent and interengaged to establish a connection presenting a single ply of material for rendering the connection flexible to permit of relative folding of the sections.

2. A lock joint for connecting the meeting edges of sections of material having outer, inner and intermediate plies, comprising portions of the outer ply of each section extending beyond the inner and intermediate plies, said portions being scored, bent and interengaged to provide a locking connection, and a portion of the inner ply of one section extending beyond the intermediate plies to provide an internal covering flap for the locking connection.

3. A lock joint for connecting the meeting edges of sections of multiple-ply corrugated material, comprising a portion of the outermost ply of each section extending beyond the inner and intermediate plies, the said extended portions being scored, bent and embracingly engaged with each other to establish a connection presenting a single ply of material for rendering the connection flexible to permit of relative folding of the sections.

4. A lock joint for connecting the meeting edges of sections of multiple-ply corrugated material, comprising a portion of the outermost ply of each section extending beyond the inner and intermediate plies, the said extended portions being scored, bent and embracingly interengaged with each other to establish a connection presenting a single ply of material for rendering the connection flexible to permit of relative folding of the sections.

5. A flexible corner lock joint for multiple-ply corrugated collapsible box bodies, comprising a portion of the outermost ply of the meeting edges extending beyond the inner and intermediate plies, the said portions being scored, bent and embracingly interengaged to establish a connection presenting a single ply of material for rendering the connection flexible to permit of relative folding of the sections.

MORRIS C. ROMER.